(12) United States Patent
Bergman et al.

(10) Patent No.: US 8,595,636 B2
(45) Date of Patent: Nov. 26, 2013

(54) METHOD AND SYSTEM FOR MAPPING GUI WIDGETS

(75) Inventors: Lawrence D. Bergman, Mount Kisco, NY (US); Vittorio Castelli, Croton-on-Hudson, NY (US); Daniel A. Oblinger, Washington, DC (US)

(73) Assignee: International Business Machines Corporation, Armonk, NY (US)

( * ) Notice: Subject to any disclaimer, the term of this patent is extended or adjusted under 35 U.S.C. 154(b) by 1312 days.

(21) Appl. No.: 11/560,383

(22) Filed: Nov. 16, 2006

(65) Prior Publication Data

US 2008/0120336 A1    May 22, 2008

(51) Int. Cl.
    *G06F 3/048*    (2013.01)
(52) U.S. Cl.
    USPC ............ 715/762; 707/999.104; 707/E17.044; 715/700
(58) Field of Classification Search
    USPC .............................. 715/704, 762, 733; 703/23
    See application file for complete search history.

(56) References Cited

U.S. PATENT DOCUMENTS

| | | | |
|---|---|---|---|
| 5,640,537 A * | 6/1997 | Jessen et al. .................... | 703/23 |
| 5,644,652 A | 7/1997 | Bellegarda et al. | |
| 6,009,452 A | 12/1999 | Horvitz | |
| 6,021,403 A | 2/2000 | Horvitz et al. | |
| 6,134,644 A | 10/2000 | Mayuzumi et al. | |
| 6,260,035 B1 | 7/2001 | Horvitz et al. | |
| 6,384,843 B1 | 5/2002 | Harel | |
| 6,466,908 B1 | 10/2002 | Baggenstoss | |
| 6,587,125 B1 | 7/2003 | Paroz | |
| 6,615,240 B1 | 9/2003 | Sullivan et al. | |
| 6,948,157 B2 | 9/2005 | Larsson et al. | |
| 7,000,187 B2 | 2/2006 | Messinger et al. | |
| 7,559,057 B2 | 7/2009 | Castelli et al. | |
| 2003/0236775 A1 * | 12/2003 | Patterson ......................... | 707/3 |
| 2004/0130572 A1 | 7/2004 | Bala | |

(Continued)

FOREIGN PATENT DOCUMENTS

| | | |
|---|---|---|
| CN | 1855021 A | 11/2006 |
| EP | 1727027 A2 | 11/2006 |
| EP | 1727027 A3 | 11/2006 |

OTHER PUBLICATIONS

Unknown, "Information Disclosures Statement," IBM China Ltd letter, Nov. 21, 2008, 2 pages.

(Continued)

*Primary Examiner* — Tadeese Hailu
*Assistant Examiner* — Darrin Hope
(74) *Attorney, Agent, or Firm* — Eustus N. Nelson; Hoffman Warnick LLC (57) ABSTRACT

As indicated above, an exemplary feature of the present invention is to automatically identify corresponding GUI elements on different computer systems, or the same computer system at different points in time. Specifically, under the present invention, a user action on a widget of a GUI provided by an application loaded a first computer system is observed, and information about the widget(s) involved in the user action as well as on all other widget(s) in the GUI is collected and associated with the user action. Thereafter a widget(s) (on which the user action is to be performed) of a GUI provided by the application as loaded on a second computer system is robustly identified using the collection information. Then, the action is performed on the identified widget(s). In identifying the widget(s), the present invention utilizes a set of hard and soft constraints to identify a matching widget(s).

14 Claims, 7 Drawing Sheets

(56) References Cited

U.S. PATENT DOCUMENTS

| | | | |
|---|---|---|---|
| 2005/0060719 A1* | 3/2005 | Gray et al. | 719/318 |
| 2005/0144150 A1 | 6/2005 | Ramamurthy et al. | |
| 2007/0094620 A1 | 4/2007 | Park | |

OTHER PUBLICATIONS

Hui-Ling Lou, "Implementing the Viterbi Algorithm," 1995, pp. 42-52, IEEE Signal Processing Magazine.

Bengio, et al., "Input-Output HMM's for Sequence Processing," 1996, pp. 1231-1249, IEEE Transactions on Neural Networks, vol. 7, No. 5.

Lawrence R. Rabiner, "A Tutorial on Hidden Markov Models and Selected Applications in Speech Recognition," 1989, pp. 257-286, Proceedings of the IEEE, vol. 77, No. 2.

Singer et al., "Maximum Likelihood Successive State Splitting," 1996, pp. 601-604, ATR Interpreting Telecommunications Res. Labs, Japan, ECS Department, Boston University, IEEE.

Dugad et al., "A Tutorial on Hidden Markov Models," 1996, pp. 1-16, Signal Processing and Artificial Neural Networks Laboratory, Department of Electrical Engineering, Indian Institute of Technology, Bombay, India.

Jeff A. Bilmes, "A Gentle Tutorial of the EM Algorithm and its Application to Parameter Estimation for Gaussian Mixture and Hidden Markov Models," 1998, pp. 1-13, International Computer Science Institute, Department of Electrical Engineering and Computer Science, U.C. Berkeley, California.

Barron, et al., "The Minimum Description Length Principle in Coding and Modeling," 1998, pp. 2743-2760, IEEE Transactions on Information Theory, vol. 44, No. 6.

Arne Leijon, "HMM Training: Practical Aspects," 2003. pp. 1-3.

Bergman et al., U.S. Appl. No. 11/560,384, Filed Nov. 16, 2006, Office Action Summary, Jun. 12, 2009, 27 pages.

Dillmann et al., "Programming by demonstration: A machine learning approach to support skill acquision for robots", 1996, Abstract only, retrieved online at http://www.springerlink.com/content/f471m35173l13763.pdf.

Lau et al., "Programming by demonstration using version space algebra", Oct. 2001, 60 pages, retrieved online at http://www.cs.washington.edu/homes/pedrod/papers/mlj02.pdf.

Roweis, "SCIA 2003 Tutorial: Hidden Markov Models", Jun. 2003, 10 pages, retrieved online at http://www.cs.toronto.edu/~roweis/notes/scia03h.pdf.

Lau, "Programming by demonstration: A machine learning approach", 2001, 139 pages, retrieved online at http://www.tlau.org/research/.

Bergman, U.S. Appl. No. 10/630,959, Filed Jul. 30, 2003, Office Action Summary, Nov. 7, 2006, 16 pages.

Bergman, U.S. Appl. No. 10/630,959, Filed Jul. 30, 2003, Office Action Summary, May 8, 2007, 20 pages.

Bergman, U.S. Appl. No. 10/630,959, Filed Jul. 30, 2003, Office Action Summary, Jan. 22, 2008, 22 pages.

Bergman, U.S. Appl. No. 10/630,959, Filed Jul. 30, 2003, Office Action Summary, Aug. 11, 2008, 20 pages.

Castelli, U.S. Appl. No. 10/729,736, Filed Dec. 5, 2003, Office Action Summary, Jul. 17, 2006, 17 pages.

Castelli, U.S. Appl. No. 10/729,736, Filed Dec. 5, 2003, Office Action Summary, Nov. 20, 2006, 18 pages.

Castelli, U.S. Appl. No. 10/729,736, Filed Dec. 5, 2003, Office Action Summary, Mar. 26, 2007, 13 pages.

Castelli, U.S. Appl. No. 10/729,736, Filed Dec. 5, 2003, Office Action Summary, Sep. 11, 2007, 16 pages.

Castelli, U.S. Appl. No. 10/729,736, Filed Dec. 5, 2003, Office Action Summary, May 21, 2008, 10 pages.

Castelli, U.S. Appl. No. 10/729,736, filed Dec. 5, 2003, Office Action Summary, Sep. 9, 2008, 10 pages.

Castelli, U.S. Appl. No. 10/729,736, Filed Dec. 5, 2003, Notice of Allowance and Fee(s) Due, Mar. 6, 2009, 11 pages.

Oblinger, U.S. Appl. No. 10/972,028, Filed Oct. 22, 2004, Office Action Summary, Jul. 25, 2008, 13 pages.

Oblinger, U.S. Appl. No. 10/972,028, Filed Oct. 22, 2004, Office Action Summary, Jan. 22, 2009, 11 pages.

Bergman, U.S. Appl. No. 11/560,384, Filed Nov. 16, 2006, Office Action Communication dated Dec. 30, 2009, 25 pages.

Hwang et al., "Nonparametric Multivariate Density Estimation: A Comparative Study" IEEE Transactions on Signal Processing, vol. 42, No. 10, Oct. 1994, pp. 2795-2810.

Hope, Office Action Communication for U.S. Appl. No. 11/560,384 dated Feb. 15, 2012, 22 pages.

Hope, Office Action Communication for U.S. Appl. No. 11/560,384 dated Aug. 15, 2012, 27 pages.

* cited by examiner

METHOD AND SYSTEM FOR MAPPING GUI WIDGETS

CROSS-REFERENCE TO RELATED APPLICATIONS

This application is related to the following U.S. patent applications: Title "REMOTE GUI CONTROL BY REPLICATION OF LOCAL INTERACTIONS" filed concurrently herewith, Ser. No. 10/630,959, entitled "SYSTEMS AND METHODS FOR GENERATING AND DISTRIBUTING EXECUTABLE PROCEDURES FOR TECHNICAL DESK-SIDE SUPPORT" and filed on Jul. 30, 2003, Ser. No. 10/729,736, entitled "ALIGNMENT AND GENERALIZATION OF DEMONSTRATED PROCEDURE TRACES" and filed on Dec. 5, 2003 Ser. No. 10/972,028, entitled "METHOD FOR INDUCING A HIDDEN MARKOV MODEL WITH A SIMILARITY METRIC" and filed on Oct. 22, 2004, each of which is assigned to the present assignee and is incorporated herein by reference, in its entirety.

BACKGROUND OF THE INVENTION

1. Field of the Invention

The invention generally relates to systems, methods, and program products for repeating actions performed on graphical user interfaces (GUIs) of applications on different computer systems. More specifically, the present invention relates to robust ways for automatically and uniquely identifying the same or analogous GUI components across different computers, where differences in configuration, versions of applications, and environment contribute to the difficulty of such task.

2. Related Art

In this document, the following terms and abbreviations are used:

System denotes any arrangement of computer hardware and/or software such as a single software program, a single computer system, and/or a computer infrastructure containing multiple pieces of hardware and/or software;

GUI is an abbreviation for Graphical User Interface; and

Widget denotes any component of the GUI with which the user can interact.

Figure 1:
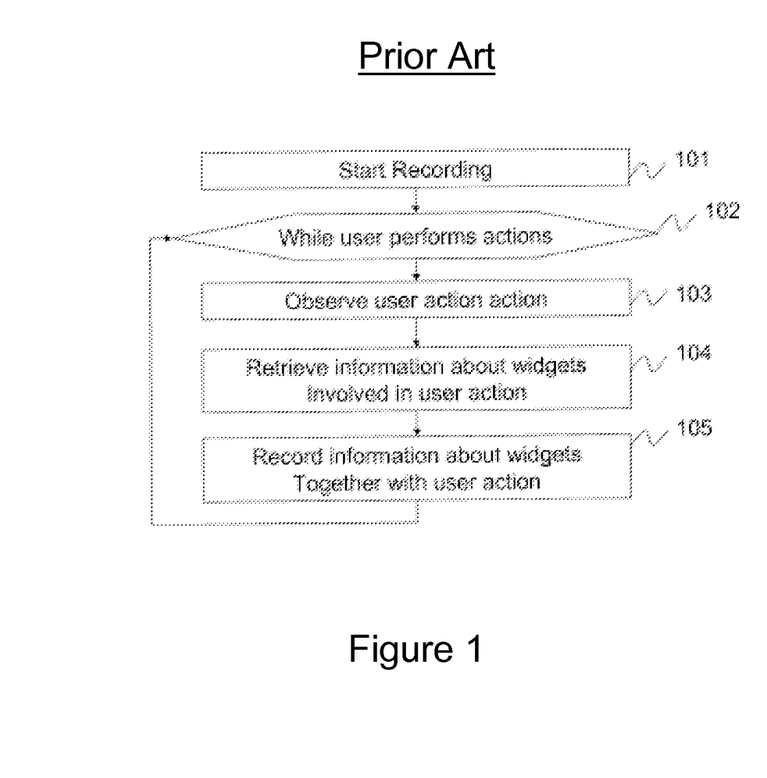
FIG. 1 depicts a method flow diagram for retrieving information about a widget upon which a user performs an action according to the prior art.

FIG. 1 shows a method known in the art for recording user actions: In Step 101, a recording of user actions and widget information is started. In general, Step 101 ensures that Steps 103, 104, and 105 are executed while the user performs actions in Step 102. In Step 103, an action performed by a user on a widget of a GUI of an application is observed. One of ordinary skills in the art would appreciate how Step 103 can be performed by means of appropriate callback functions invoked by an operating system or by a virtual machine on which the application is running, in response to user actions. Most modern operating systems provide facilities for any application to set "hooks". Hooks are in fact callback registrations for particular types of events. For example, Microsoft Windows (in all incarnations, including 98, 2000, XP) provides a variety of such hooks (Microsoft, Windows and related terms are trademarks of Microsoft, Inc. in the United States and/or other countries). Similar facilities are provided by the Java Virtual Machine (JVM) on which Java applications run (Java, JVM, and related terms are trademarks of Sun Microsystems, Inc. in the United States and/or other countries).

In Step 104 information about the widget (or widgets) involved in the user action is retrieved. As one of ordinary skills in the art would appreciate, modern computer systems typically provide means for obtaining information about a user interface widgets upon which action is being taken. For example, the various versions of the Microsoft Window operating systems provide means for programmatically acquiring information about UI widgets. A first category of means is provided by Microsoft Active Accessibility, a collection of software interfaces that allow users to programmatically retrieve certain pieces information about most widgets. A second category of means is provided by native Windows calls and messages, which allow the user to programmatically retrieve the certain pieces information. In still another example, it is possible to retrieve information regarding the widgets of applications running on JVMs using a mechanism called introspection. Regardless, Step 105 associates/records the information retrieved in Step 104 to the user action observed in Step 103.

Figure 2:
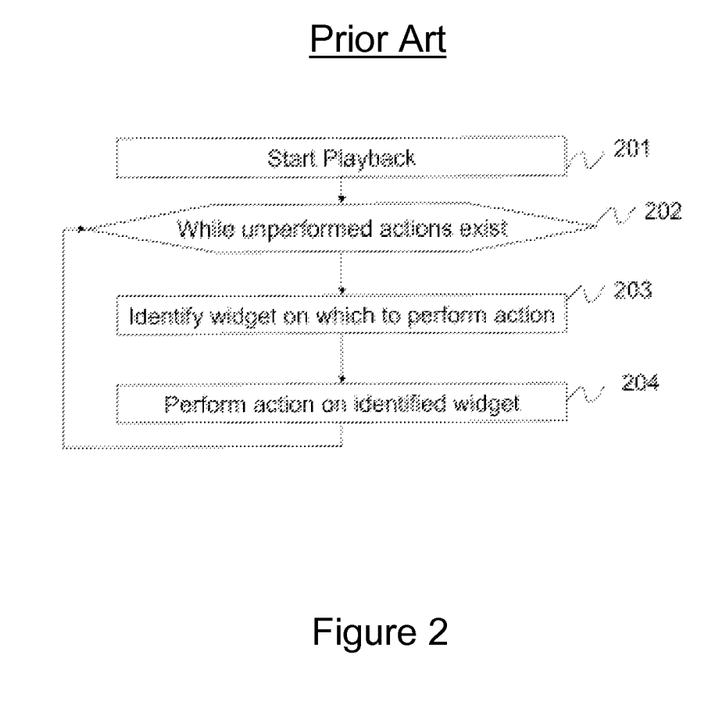
FIG. 2 depicts a method flow diagram for executing an action according to the prior art.

FIG. 2 shows a method taught in the art for automatically executing a sequence of actions on an application GUI or on the GUI of multiple applications. In Step 201 the playback is started and appropriate initializations are performed. Step 202 iterates over the actions to be performed. Step 203 identifies the widget(s) involved in the action to be performed. Step 204 performed the action on identified widgets.

Unfortunately, none of these prior art approaches provide a way automatically and uniquely identifying the same or analogous GUI components across different computers, where differences in configuration, versions of applications, and environment contribute to the difficulty of such task, or within the same computer, where changes in UI configuration or in the user environment, as well as other causes, result in the mentioned difficulties. For example, there have been two ways of performing Step 203. The first consists of recording, in Step 104 of FIG. 1, positional information on the widget(s) upon which the user action was performed. Then Step 203 of Figure identifies the widget(s) at the recorded location and Step 204 performs the action on the identified widget(s). This method suffers from fragility. That is, if for some reason the position of a widget at the time of playback is different from its position at the time of playback, the method can fail to identify the widget. A second method taught in the art consists of recording, for each widget involved in a user action, a list of widget(s) in the path from the widget to its root window (this is, in Microsoft Windows, the window with a title bar that is not contained in any other window, and that contains the widget.) The limitation of this method is that multiple widgets can exist having the same path to the root window. For example, if an application has multiple toolbars, these toolbars can have the same path to the root window, and can be very difficult to distinguish from each other.

In view of the foregoing, there exists a need for a solution that solves at least one of the deficiencies of the related art.

SUMMARY OF THE INVENTION

In view of the foregoing and other exemplary problems, drawbacks, and disadvantages of the conventional methods and structures, an exemplary feature of the present invention is to automatically identify corresponding GUI elements on different computer systems. Specifically, the present invention provides an approach for identifying corresponding widgets in different computer systems, or on the same computer system at different points in time, where differences in configuration, GUI layout, or versions of applications or of the operating system limit the applicability of other methods taught in the art. Among other things, the present invention observes a user action on a widget of a GUI provided by an application loaded a first computer system, collects information about the widget(s) involved in the user action as well as on all other widget(s) in the GUI, and associated the collected information with the user action. Then a widget(s) (on which the user action is to be performed) of a GUI provided by the application as loaded on a second computer system is robustly identified using the collection information. Thereafter, the action is performed on the identified widget(s). In identifying the widget(s), the present invention utilizes a set of hard and soft constraints to identify a matching widget(s).

A first aspect of the present invention provides a method for mapping Graphical User Interface (GUI) widgets, comprising: observing a user action with a widget of a GUI provided by an application loaded on a first computer system; collecting information about the widget and about all other widgets in the GUI; and associating the information with the user action.

A second aspect of the present invention provides a system for mapping Graphical User Interface (GUI) widgets, comprising: means for observing a user action with a widget of a GUI provided by an application loaded on a first computer system; means for collecting information about the widget and about all other widgets in the GUI; and means for associating the information with the user action.

A third aspect of the present invention provides a program product stored on a computer readable medium for mapping Graphical User Interface (GUI) widgets, the computer readable medium comprising program code for causing a first computer system to: observe a user action with a widget of a GUI provided by an application loaded on the first computer system; collect information about the widget and about all other widgets in the GUI; and associate the information with the user action.

A fourth aspect of the present invention provides a method for deploying a system for mapping Graphical User Interface (GUI) widgets, comprising: providing a computer infrastructure being operable to: observe a user action with a widget of a GUI provided by an application loaded on a first computer system; collect information about the widget and about all other widgets in the GUI; and associate the information with the user action.

A fifth aspect of the present invention provides computer software embodied in a propagated signal for mapping Graphical User Interface (GUI) widgets, the computer software comprising instructions for causing a first computer system to: observe a user action with a widget of a GUI provided by an application loaded on the first computer system; collect information about the widget and about all other widgets in the GUI; and associate the information with the user action.

A sixth aspect of the present invention provides a data processing system for mapping Graphical User Interface (GUI) widgets, the data processing system comprising a processor; a bus coupled to the processor; a memory medium coupled to the bus, the memory medium comprising program code for causing the processor to: observe a user action with a widget of a GUI provided by an application loaded on the first computer system; collect information about the widget and about all other widgets in the GUI; and associate the information with the user action.

Each of these aspects further provide one or more of the following functions: identify a widget of a GUI provided by the application as loaded on a second computer system on which to perform the user action; perform the user action on the identified widget; obtain a set of hard constraints and a set of soft constraints; discard all widgets in the GUI on the second computer system that do not match the set of hard constraints to yield a quantity of retained widgets; if the quantity of retained constraints is greater than one, score the quantity of retained widgets using the set of soft constraints; and returning a widget having a highest score based on the scoring; maintain a database containing descriptions of currently available windows and widgets for the application; register callback functions for window creations, deletions, and changes; analyze existing windows; store the information in the database; and/or order the set of hard constraints so that those that discard candidate widgets most efficiently are evaluated first.

Therefore, the present invention provides various approaches for mapping GUI widgets.

BRIEF DESCRIPTION OF THE DRAWINGS

The foregoing and other exemplary purposes, aspects and advantages will be better understood from the following detailed description of an exemplary embodiment of the invention with reference to the drawings.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, the present invention is to automatically identify corresponding GUI elements on different computer systems. Specifically, the present invention provides an approach for identifying corresponding widgets in different computer systems or on the same computer system at different points in time, where differences in configuration, GUI layout, or versions of applications or of the operating system limit the applicability of other methods taught in the art. The descriptions in the embodiment specifically refer to the case of different computer systems, but one of ordinary skills in the art would recognize how the descriptions would apply to a single computer where the configuration, GUI layout, or versions of applications or of the operating system change over time. Among other things, the present invention observes a user action on a widget of a GUI provided by an application loaded on a first computer system, collects information about the widget(s) involved in the user action as well as on all other widget(s) in the GUI, and associated the collected information with the user action. Then a widget(s) (on which the user action is to be performed) of a GUI provided by the application as loaded on a second computer system is robustly identified using the collection information. Thereafter, the action is performed on the identified widget(s). In identifying the widget(s), the present invention utilizes a set of hard and soft constraints to identify a matching widget(s). It should be understood that the teachings recited herein can be implemented with a single computer system and two different points in time. In such a case, they can still be referred to as a first and a second computer system.

Figure 3:
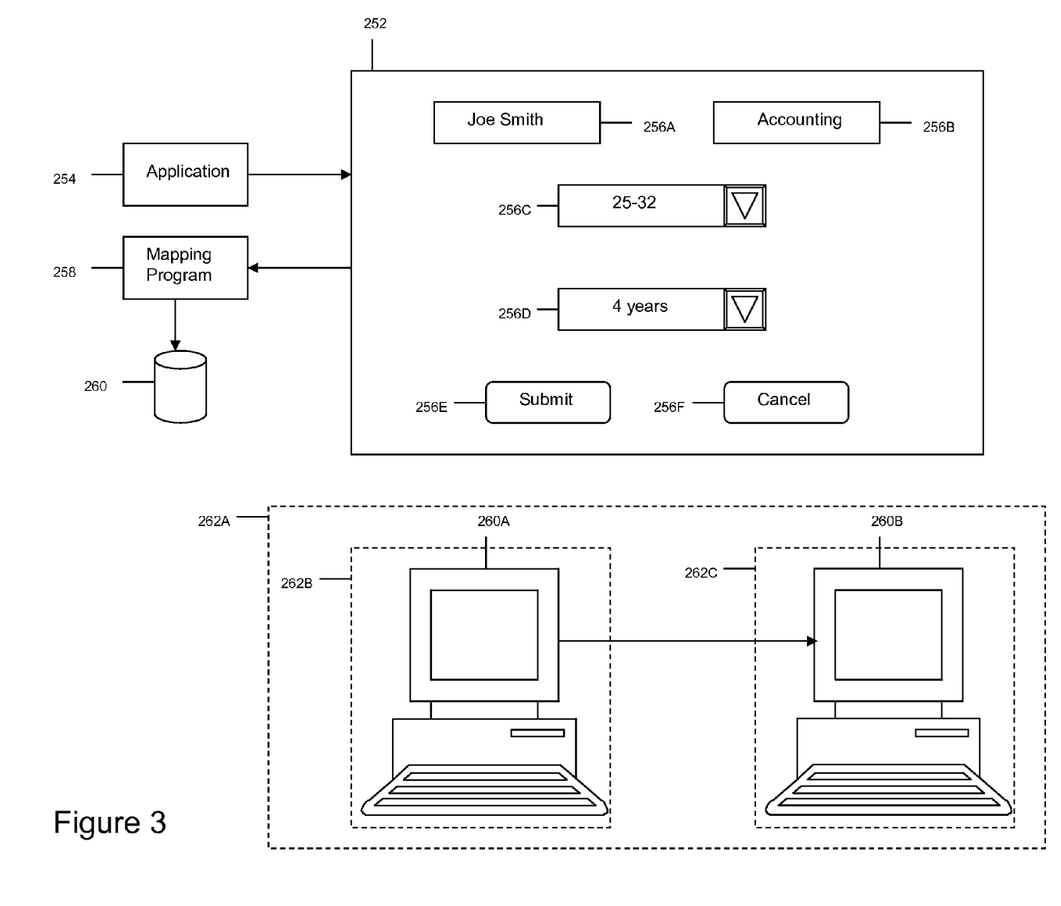
FIG. 3 depicts an illustrative GUI of an application on a first and/or second computer system according to the present invention.

Referring now to FIG. 3, an illustrative environment 250 for mapping GUI 252 widgets 256A-F according to the present invention is shown. Specifically, GUI 252 is typically provided by application 254, which is loaded on both computer systems 260A-B. Under the present invention computer systems 260A-B can be distinct computer systems, or the same computer system at different points in time. Also provided on both computer systems is mapping program 258. In general, mapping program 258 allows widgets 256A-F as appearing on computer system 260A to be mapped to the same widgets 256A-F as appearing on computer system 260B. Along these lines and as will be further described below, when a user performs an action on a widget 256A-F computer system 260A, mapping program 258 (among other things) will observe and record the user action, collect/retrieve information about the involved widget(s) as well as all other widget(s) in GUI 252. This information will be associated with the user action, and then later used to identify the involved widget(s) in GUI 252 as it appears on computer system 260B.

It should be understood that widgets 256A-F shown include fields 256A-B, drop-down menus 256C-D, and buttons 256E-F. However, the present invention is not limited to the types of widgets 256A-F shown. For example, the same concepts could be applied to radio buttons, etc. It should also be understood that mapping program 258 represents a collection of program code stored on a memory medium that is executed by processors of computer systems 260A-B. To this extent, mapping program 258 provides all functions of the present invention including, but not limited to, that which is described and shown in conjunction with to FIGS. 4-7. This could be implemented by a single module within mapping program 258 or multiple modules within mapping program 258. As further shown in FIG. 3, computer systems 260A-B could be deployed within a common infrastructure 262A, or in distinct computer infrastructures 262B-C.

Figure 4:
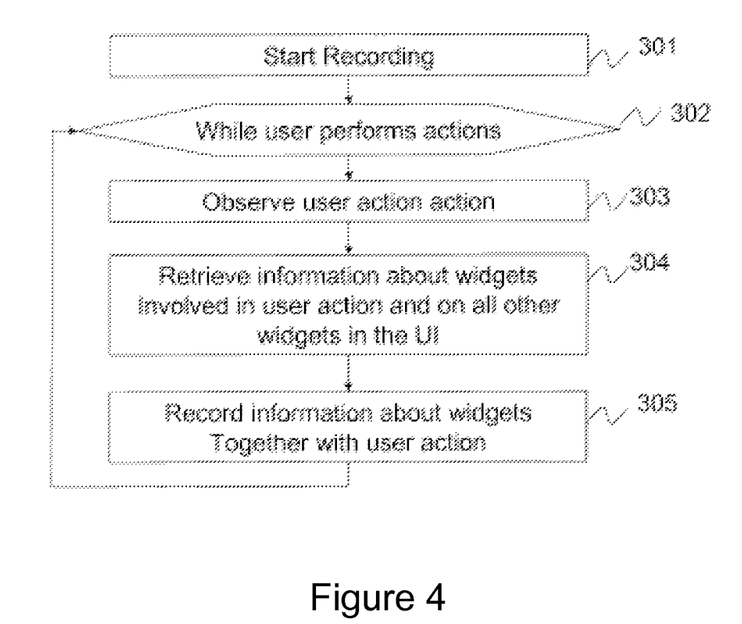
FIG. 4 depicts a method flow diagram for retrieving information about all widgets in a GUI according to the present invention.

In any event, referring now to FIG. 4 a method flow diagram for retrieving information about all widgets in a GUI according to the present invention is shown. In a typical embodiment, information/data collection during recording is performed using the method described in FIG. 4. Specifically, in Step 301, a recording is started. Step 302 indicates that Steps 303-305 are typically performed while the user performs an action on a widget 256A-F (FIG. 3) of GUI 252 (FIG. 3). Specifically, a user action is observed in step 303. In Step 304, information about any widget(s) involved in the user action as well as all other widgets in GUI 252 is collected/retrieved. In step 305, the collected information is associated/recorded together with the user action.

Figure 5:
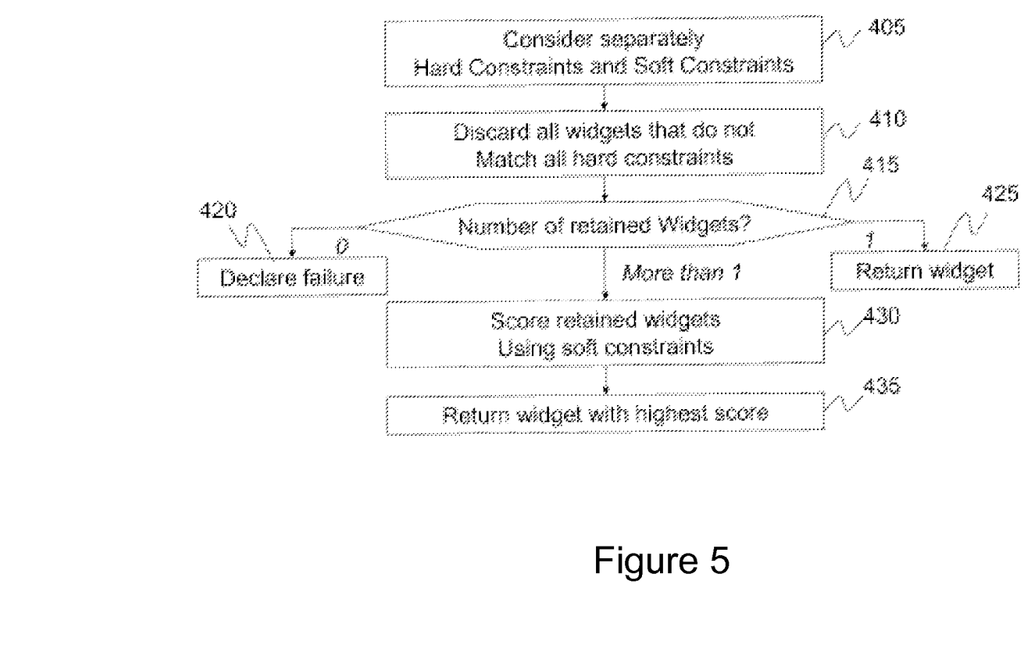
FIG. 5 depicts a method flow diagram for using information gathered according to the method flow diagram of FIG. 4 to robustly identify widgets on a computer system according to the present invention.

Turning now to FIG. 5, a method for using the information collected according to the method of FIG. 3 to robustly identify widgets is described. For the purposes of this disclosure, the term "constraint" refers to any function of the attributes of a widget (namely, of the widget description) that returns a value that denotes the matches a set of characteristics. For example, the class of a widget can be constrained to be equal to a specific widget class, such as a Button. This constraint evaluates to "match" or "no match" depending on whether the widget is a Button or not. As another example, the upper-left corner of a widget can be constrained to be at or close to a specific position within its root window. This constraint can, for instance, return a numeric value, such as the Euclidean distance between the specified position and the actual position, which denotes how well the widget satisfies the constraint. Another example of numeric value is a fuzzy value, for example, if the constraint is "near the upper left corner of the main window" can be automatically evaluated to a fuzzy membership function that takes values between zero and one. Other examples of constraints having non-numeric values include hierarchical information describing the nesting of the desired widget within other containing widgets, order information (for example, the order in a list), the text of the widget, the proximity of other specific widgets (for example, the proximity of an input field to a text label), the co-occurrence with other widgets within the same containing widget, etc.

A constraint is "hard" if it has to be satisfied exactly. A constraint that is not hard is called "soft". When trying to identify a widget, a collection of constraints is used. How such a collection is constructed is described below. The method of FIG. 5 begins by separating a set (at least one) of hard constraints from a set (at least one) of soft constraints (e.g., Step 405). The widgets visible on the GUI are then analyzed first using the set of hard constraints, and widgets that do not match all of the set of hard constraints are discarded (e.g., Step 410). For example each widget can be analyzed in turn, the set of hard constraints can be evaluated sequentially, and as soon as the widget does not match a constraint, the widget is discarded from consideration. One of ordinary skills in the art would appreciate that the order in which the set of hard constraints are evaluated can be selected to maximize the efficiency of the discarding process. For example, hard constraints that are more likely to discard a large number of widgets can be evaluated earlier than hard constraints that are less likely to discard a small number of widgets. The ability of a hard constraint to discard a large number of widgets can be, for instance, determined a-priori by an expert, or determined from observation of the content of widgets. In a typical embodiment, determining the order in which the set of hard constraints should be applied from observations in an individualized fashion is described below.

In any event, if the number of widgets retained by Step 410 is equal to zero (as checked, for example, by Step 415), the method declares failure to identify a widget satisfying the set of hard constraints (e.g., Step 420). If only one widget satisfies the set of hard constraints, then this widget is returned as the result of the search (e.g., Step 425). Otherwise, the retained widgets are scored using the set of soft constraints (e.g., Step 430). In a typical embodiment, each soft constraint has an associated weight which denotes the importance of the soft constraint in identifying the widget. Soft constraints that return "true" and "false" have their return values turned into numeric values, for example "true" become 1, and "false" becomes 0. Soft constraints that return a numeric values have the returned value normalized so that a returned value of 1 denotes perfect match, and a value of 0 denotes a complete mismatch. All soft-constraints are evaluated on each of the retained widgets. The evaluated values are then combined, for example, using a linear combination where the coefficients are the above described associated weight. One of ordinary skills in the art would appreciate that other means of combining the evaluated values using the associated weights are also possible.

Once the retained widgets have been scored, they are sorted in decreasing score. Since scores denote goodness-of-match, the widget with the highest score is returned (e.g., Step 435). Ties can be broken, for example, by random selection, or by specifying an ordering of the constraints, such that if two (or more) widgets have the same score (as computed by Step 430), the values of the first constraint in the ordering is compared, and if one widget has a higher score for that particular constraint, it is returned, otherwise the values of the second constraint are compared similarly, and so on. If the constraints are well-selected, in general the described method breaks remaining ties (for example, two widgets of the same type that provide a control or visual feedback for the user cannot occupy the same position on the screen and be both visible at the same time, hence location would break ties). The described process is performed, for instance, by Step 435.

Figure 6:
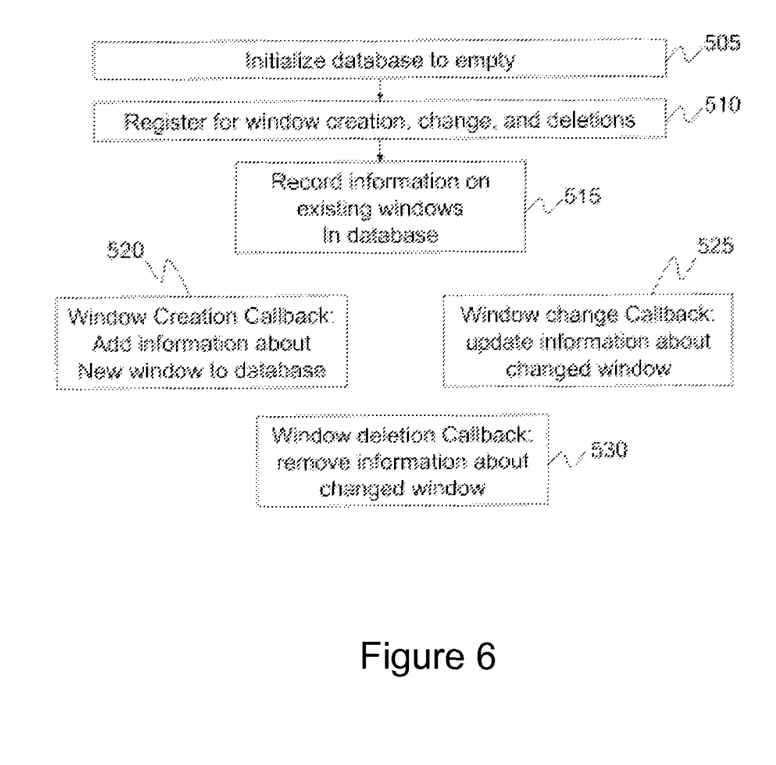
FIG. 6 depicts a method flow diagram for maintaining a database of currently available windows and widgets according to the present invention.

Before a typical embodiment of a method for optimizing Step 410 of FIG. 5, a method for ordering hard constraints, and a method for assigning scores to soft constraints is described, a method for maintaining a database 264 (FIG. 3) containing the descriptions of the currently available windows and widgets is described by referring to FIG. 6. First, database 264 is initialized using known techniques in the art, as one of ordinary skills in the art would appreciate in Step 505. Then callback functions are registered for window creations, deletions, and changes in Step 510. The existing windows are then analyzed and relevant information (e.g., the information retrieved in Step 304 of FIG. 4) is retrieved and stored in the database in Step 515. Steps 520, 525, and 530 are performed when a specific callback function is invoked (in correspondence of a window creation, window change, and window deletion, respectively), and therefore are not executed in any predetermined order, and in general are executed separately and at different points in time.

When a window-creation callback is invoked, information about the new window is retrieved (e.g., the same information retrieved by Step 515), and added to database 264 in Step 520. When a window-change callback is invoked, information about the changed window is retrieved and the database record for the window is updated. Depending on how specific the callback function is (e.g., depending on the degree to which it pinpoints the specific information that has changed in the window) selected information about the window can be retrieved, rather than all the information about the window in Step 525. When a window-deletion callback is invoked, the record containing the information about the deleted window is removed from the database in Step 530.

Figure 7:
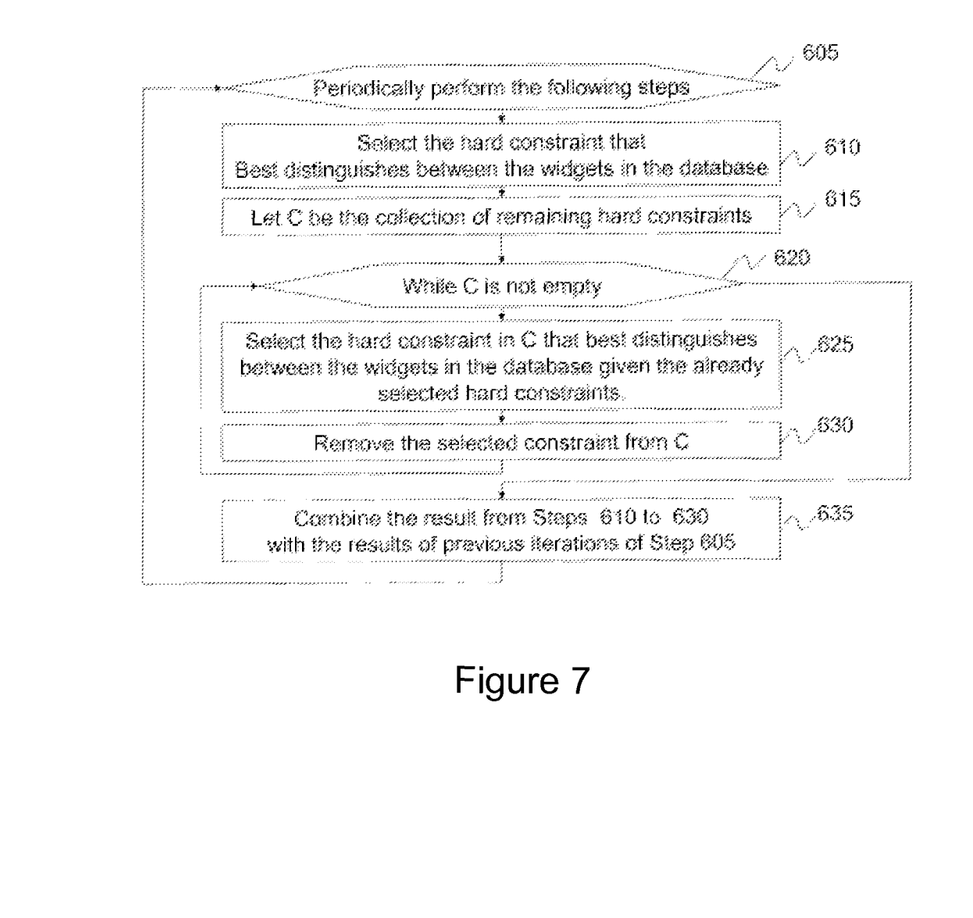
FIG. 7 depicts a method flow diagram for ordering hard constrains according to the present invention.

Referring now to FIG. 7 a method for ordering the set of hard constraints so that those that discard most efficiently irrelevant candidate widgets are evaluated first is described. This method generally relies on observations. One of ordinary skills in the art would appreciate that an alternative to the method of FIG. 7 comprises ordering the set of hard constraints a-priori, and this is an approach that can be used in conjunction with the other methods described in this patent. The method of FIG. 7 is an adaptive strategy, and therefore is in general advantageous over a static strategy. The steps described in FIG. 7 are performed periodically, where the periodicity of the schedule could be selected to be a fixed amount of time, or could be decided based on an adaptive approach, for example by detecting when a predefined fraction of the database content has changed (e.g., Step 605 decides when the following steps should be executed).

In a typical embodiment, in Step 610, the hard constraint that best distinguishes between the widgets in the database is selected. Recall that a hard constraint retains widgets that satisfies it, and discards the other widgets. For sake of simplicity, in the following discussion we concentrate the attention on hard constraints where the value of a specific attribute is compared to a desired value (for example, the class of the widget is compared to the class "Button"). Consider for example an attribute X having values in the database when Step 605 initiates the execution of the following steps. In a preferred embodiment, the assumption is made that each existing widget could be the target of identification and that all widgets have the same probability of being the target of identification. In this embodiment, let P1, . . . , Pn be respectively the fractions of widgets for which the attribute has value X1, . . . , Xn, respectively. Then, the probability of having to retrieve a widget for which the attribute has value Xj is Pj. When such widget is the target of retrieval and the constraint on attribute J is evaluated, the fraction of discarded widgets is (1−Pj). Averaging over all widgets, we obtain that the average fraction of discarded widgets is:

$$\Sigma_{j=1,\ldots,n} p_j(1-p_j) = \Sigma_{j=1,\ldots,n} p_j - p_j^2$$

Then, the attribute for which the sum is highest is selected. In another embodiment, instead of assuming that the widgets are equiprobably selected for retrieval, the probabilities of retrieval are estimated from observations. Then, for each j, the quantity Pj are computed as the sums of the retrieval probabilities of the widgets having attribute value equal to x and the equation used to select the first widget is formally identical to above equation.

Once the hard constraint that best reduces the number of candidate widgets is identified in Step 610, a collection (C,) is constructed containing the remaining constraints in Step 615. Step 620 iterates on this collection and ensures that Steps 625 and 630 are executed while C still contains constraints. Step 635 combines the results produced by Steps 610 to 630 with the results of previous iterations of Step 605. In a typical embodiment, Step 635 discards the result of previous iterations of Step 605, and retains the current results until the next iteration of Step 605. In a different embodiment, Step 635 considers the results of the past K iterations, and combines them by selecting as first constraint the hard constraint most commonly selected by Step 610 during the past K iterations, and selecting the hard constraints that follow in the same fashion.

The set of soft constraints can also be ranked using the content of database 264 from one or more computer systems. In one embodiment, the content of database 264 would be periodically analyzed, and the variability of each constraint for a widget would be evaluated, and compared to the variability across widgets. For example, consider a list of items. A soft constraint for a specific item could be a constraint on its position in the list. This in general would not be fixed, but could vary. This variability can be measured in several ways, for example in terms of the variance or the entropy of the position. The across-item attribute variability can be estimated by considering each pair of items in the list, computing the difference in position, and computing a statistics such as the variance of this difference or the mean of the absolute values. If the variability of the attribute for an item is small compared to the across-item variability, then the constraint is likely to be useful in identifying a specific item. On the opposite hand, if the variability of the attribute for individual items is comparable to the variability across items, then a constraint on the index of the item might have limited usefulness in identifying a specific item.

One of ordinary skills in the art would appreciate how the methods taught in this invention can be applied whenever there is a need to robustly identify widgets, and are not limited to the applications that perform actions on the identified widgets. For example, they can be applied to applications, such as computer assisted instruction programs and assisted walk-through programs, in situations where the programs do not actually perform actions on the identified widgets, but highlight the widgets for the user benefit (e.g., to direct the user to interact with the highlighted widget or attract the attention of the user to the content of the widget).

While shown and described herein as widget mapping solution, it is understood that the invention further provides various alternative embodiments. For example, in one embodiment, the invention provides a computer-readable/useable medium that includes computer program code to enable a computer infrastructure to map widgets. To this extent, the computer-readable/useable medium includes program code that implements each of the various process of the invention. It is understood that the terms computer-readable medium or computer useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a device (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process of the invention on a subscription, advertising, and/or fee basis. That is, a service provider, such as a Solution Integrator, could offer to map widgets. In this case, the service provider can create, maintain, deploy, support, etc., a computer infrastructure that performs the process of the invention for one or more customers. In return, the service provider can receive payment from the target organization(s) under a subscription and/or fee agreement and/or the service provider can receive payment from the sale of advertising content to one or more third parties.

In still another embodiment, the invention provides a computer-implemented method for mapping widgets. In this case, a computer infrastructure can be provided and one or more systems for performing the process of the invention can be obtained (e.g., created, purchased, used, modified, etc.) and deployed to the computer infrastructure. To this extent, the deployment of a system can comprise one or more of (1) installing program code on a device such as controlling and/or controlled computers, from a computer-readable medium; (2) adding one or more devices to the computer infrastructure; and (3) incorporating and/or modifying one or more existing systems of the computer infrastructure to enable the computer infrastructure to perform processes according to one or more aspects of the invention.

As used herein, it is understood that the terms "program code" and "computer program code" are synonymous and mean any expression, in any language, code or notation, of a set of instructions intended to cause a device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular providing and/or I/O device, and the like.

Aspects of the invention can take the form of an entirely software embodiment or an embodiment containing both hardware and software elements. In an embodiment, aspects of the invention are implemented in software, which includes but is not limited to firmware, resident software, microcode, etc. Furthermore, aspects of the invention can take the form of a computer program product accessible from at least one computer-usable or computer-readable medium storing program code for use by or in connection with a computer or any instruction execution system. For the purposes of this description, a computer-usable or computer readable medium can be any tangible apparatus that can contain, store, communicate, propagate, and/or transport the program for use by or in connection with the instruction execution system, apparatus, device, and/or the like.

The medium can be an electronic, magnetic, optical, electromagnetic, infrared, or semiconductor system (or apparatus or device), a propagation medium, and/or the like. Examples of a computer-readable medium include, but are not limited to, a semiconductor or solid state memory, magnetic tape, a removable computer diskette, a random access memory (RAM), a read-only memory (ROM), a rigid magnetic disk and an optical disk. Current examples of optical disks include, but are not limited to, compact disk—read only memory (CD-ROM), compact disk—read/write (CD-R/W) and DVD.

A data processing system suitable for storing and/or executing program code can include at least one processor communicatively coupled, directly or indirectly, to memory element(s) through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output or I/O devices (including, but not limited to, keyboards, displays, pointing devices, etc.) can be coupled to the system either directly or through intervening I/O controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems and Ethernet cards.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A method for mapping Graphical User Interface (GUI) widgets, comprising:

observing a user action with a widget of a GUI provided by an application loaded on a first computer system, the widget initiating a function within the application when acted upon by a user;

collecting information about the widget and about all other widgets in the GUI;

associating all of the information with the user action;

identifying, based on the information, a corresponding widget of a GUI provided by the application as loaded on a second computer system on which to perform the user action, the corresponding widget having a same function as the widget, the identifying including:

obtaining a set of hard constraints and a set of soft constraints;

discarding all widgets in the GUI on the second computer system that do not match the set of hard constraints to yield a quantity of retained widgets;
if the quantity of retained constraints is greater than one, scoring the quantity of retained widgets using the set of soft constraints to obtain a widget having a highest score; and
returning a single widget that is either the only retained constraint or is the widget having the highest score the quantity of retained constraints is greater than one; and
performing the user action on the identified widget to initiate the function within the application located on the second computer system,
wherein the GUI on the second computer system is configured differently from the GUI on the first computer system and wherein the user actions are represented differently on the GUI of the first computer system than on the GUI of the second computer system.

2. The method of claim 1, the first computer system being distinct from the second computer system.

3. The method of claim 1, the second computer system being the first computer system at a different point in time.

4. The method of claim 1, further comprising maintaining a database containing descriptions of currently available windows and widgets for the application.

5. The method of claim 4, the maintaining comprising:
registering callback functions for window creations, deletions, and changes;
analyzing existing windows; and
storing the information in the database.

6. The method of claim 4, further comprising ordering the set of hard constraints so that those that discard candidate widgets most efficiently are evaluated first.

7. A system for mapping Graphical User Interface (GUI) widgets, comprising:
at least one computer device, that performs a method, comprising:
observing a user action with a widget of a GUI provided by an application loaded on a first computer system, the widget initiating a function within the application when acted upon by a user;
collecting information about the widget and about all other widgets in the GUI;
associating all of the information with the user action;
identifying, based on the information, a corresponding widget of a GUI provided by the application as loaded on a second computer system on which to perform the user action, the corresponding widget having a same function as the widget, the identifying including:
obtaining a set of hard constraints and a set of soft constraints;
discarding all widgets in the GUI on the second computer system that do not match the set of hard constraints to yield a quantity of retained widgets;
if the quantity of retained constraints is greater than one, scoring the quantity of retained widgets using the set of soft constraints to obtain a widget having a highest score; and
returning a single widget that is either the only retained constraint or is the widget having the highest score the quantity of retained constraints is greater than one; and
performing the user action on the identified widget to initiate the function within the application located on the second computer system,
wherein the GUI on the second computer system is configured differently from the GUI on the first computer system and wherein the user actions are represented differently on the GUI of the first computer system than on the GUI of the second computer system.

8. The system of claim 7, the method further comprising maintaining a database containing descriptions of currently available windows and widgets for the application.

9. The system of claim 8, the maintaining comprising:
registering callback functions for window creations, deletions, and changes;
analyzing existing windows; and
storing the information in the database.

10. A program product stored on a computer readable storage medium for mapping Graphical User Interface (GUI) widgets, the computer readable medium comprising program code for causing a first computer system to:
observe a user action with a widget of a GUI provided by an application loaded on a first computer system, the widget initiating a function within the application when acted upon by a user;
collect information about the widget and about all other widgets in the GUI;
associate all of the information with the user action;
identify, based on the information, a corresponding widget of a GUI provided by the application as loaded on a second computer system on which to perform the user action, the corresponding widget having a same function as the widget, the identifying including:
obtaining a set of hard constraints and a set of soft constraints;
discarding all widgets in the GUI on the second computer system that do not match the set of hard constraints to yield a quantity of retained widgets;
if the quantity of retained constraints is greater than one, scoring the quantity of retained widgets using the set of soft constraints to obtain a widget having a highest score; and
returning a single widget that is either the only retained constraint or is the widget having the highest score the quantity of retained constraints is greater than one; and
perform the user action on the identified widget to initiate the function within the application located on the second computer system,
wherein the GUI on the second computer system is configured differently from the GUI on the first computer system and wherein the user actions are represented differently on the GUI of the first computer system than on the GUI of the second computer system.

11. The program product of claim 10, further comprising program code for causing the first computer system to maintain a database containing descriptions of currently available windows and widgets for the application.

12. The program product of claim 11, further comprising program code for causing the first computer system to:
register callback functions for window creations, deletions, and changes;
analyze existing windows; and
store the information in the database.

13. The program product of claim 12, further comprising program code for ordering the set of hard constraints so that those that discard candidate widgets most efficiently are evaluated first.

14. A method for deploying a system for mapping Graphical User Interface (GUI) widgets, comprising:
providing a computer infrastructure being operable to:

observe a user action with a widget of a GUI provided by an application loaded on a first computer system;

collect information about the widget and about all other widgets in the GUI; and associate all of the information with the user action;

identify, based on the information, a corresponding widget of a GUI provided by the application as loaded on a second computer system on which to perform the user action, the corresponding widget having a same function as the widget, the identifying including:

obtaining a set of hard constraints and a set of soft constraints;

discarding all widgets in the GUI on the second computer system that do not match the set of hard constraints to yield a quantity of retained widgets;

if the quantity of retained constraints is greater than one, scoring the quantity of retained widgets using the set of soft constraints to obtain a widget having a highest score; and     returning a single widget that is either the only retained constraint or is the widget having the highest score the quantity of retained constraints is greater than one; and perform the user action on the identified widget to initiate the function within the application located on the second computer system, wherein the GUI on the second computer system is configured differently from the GUI on the first computer system and wherein the user actions are represented differently on the GUI of the first computer system than on the GUI of the second computer system.

\* \* \* \* \*